US010182093B1

(12) United States Patent
Klapuri

(10) Patent No.: US 10,182,093 B1
(45) Date of Patent: Jan. 15, 2019

(54) COMPUTER IMPLEMENTED METHOD FOR PROVIDING REAL-TIME INTERACTION BETWEEN FIRST PLAYER AND SECOND PLAYER TO COLLABORATE FOR MUSICAL PERFORMANCE OVER NETWORK

(71) Applicant: Yousician Oy, Helsinki (FI)

(72) Inventor: Anssi Klapuri, Espoo (FI)

(73) Assignee: YOUSICIAN OY, Helsinki (FI)

( * ) Notice: Subject to any disclaimer, the term of this patent is extended or adjusted under 35 U.S.C. 154(b) by 0 days.

(21) Appl. No.: 15/701,785

(22) Filed: Sep. 12, 2017

(51) Int. Cl.
*G10H 1/00* (2006.01)
*H04L 29/06* (2006.01)

(52) U.S. Cl.
CPC ............ *H04L 65/60* (2013.01); *G10H 1/0066* (2013.01); *H04L 65/1069* (2013.01); *G10H 2240/305* (2013.01)

(58) Field of Classification Search
CPC ............................ H04L 65/60; H04L 65/1069
See application file for complete search history.

(56) References Cited

U.S. PATENT DOCUMENTS

| | | | | |
|---|---|---|---|---|
| 5,020,101 A * | 5/1991 | Brotz | ................... | G10H 1/0033 379/388.02 |
| 6,482,087 B1 * | 11/2002 | Egozy | ................... | A63F 13/12 463/42 |
| 6,653,545 B2 * | 11/2003 | Redmann | ............. | G10H 1/0058 84/609 |
| 6,898,637 B2 * | 5/2005 | Curtin | ................... | H04M 3/56 709/205 |
| 7,297,858 B2 * | 11/2007 | Paepcke | ............... | G10H 1/0066 84/609 |
| 7,405,355 B2 * | 7/2008 | Both | ................... | G10H 1/0058 84/645 |
| 7,518,051 B2 * | 4/2009 | Redmann | ............. | G10H 1/0058 84/601 |
| 7,714,222 B2 * | 5/2010 | Taub | ................... | G10H 1/0058 84/600 |
| 8,487,173 B2 * | 7/2013 | Emmerson | ........... | G10H 1/0025 84/601 |
| 8,653,349 B1 * | 2/2014 | White | .................. | G10H 1/0025 381/119 |

(Continued)

*Primary Examiner* — Robert W Horn
(74) *Attorney, Agent, or Firm* — Ziegler IP Law Group, LLC

(57) ABSTRACT

Providing real-time interaction between a first player and a second player to collaborate for a musical performance over a network, includes maintaining a reference data item generated using a musical instrument performed by a user; receiving first user input data generated using a first musical instrument, the received first user input data associated with the first musical instrument and the musical performance; receiving second user input data generated using a second musical instrument, the received second user input data associated with the second musical instrument and the musical performance; detecting a missing data packet within the received second user input data when generating real-time collaboration data for the musical performance; replacing the missing data packet using the reference data item to correct the second user input data; and generating real-time collaboration data for the musical performance based on the corrected second user input data.

20 Claims, 6 Drawing Sheets

(56) References Cited

U.S. PATENT DOCUMENTS

| | | | |
|---|---|---|---|
| 8,826,355 B2* | 9/2014 | DeLorme, Sr. | H04N 7/17327 |
| | | | 725/109 |
| 9,406,289 B2* | 8/2016 | Skillings | G10H 1/0033 |
| 9,693,031 B2* | 6/2017 | Raniere | G11B 27/002 |
| 9,979,766 B2* | 5/2018 | Kondo | H04L 65/60 |
| 2007/0140510 A1* | 6/2007 | Redmann | G10H 1/0058 |
| | | | 381/97 |
| 2007/0255816 A1* | 11/2007 | Quackenbush | G10H 1/0058 |
| | | | 709/223 |
| 2008/0060499 A1* | 3/2008 | Sitrick | G09B 15/002 |
| | | | 84/477 R |
| 2008/0060506 A1* | 3/2008 | Laycock | G09B 5/12 |
| | | | 84/645 |
| 2008/0201424 A1* | 8/2008 | Darcie | H04N 7/15 |
| | | | 709/204 |
| 2008/0215681 A1* | 9/2008 | Darcie | H04L 12/66 |
| | | | 709/204 |
| 2009/0070420 A1* | 3/2009 | Quackenbush | G06F 17/30 |
| | | | 709/204 |
| 2009/0113022 A1* | 4/2009 | Quoc | G06Q 10/10 |
| | | | 709/218 |
| 2010/0319518 A1* | 12/2010 | Mehta | G10H 1/0058 |
| | | | 84/625 |
| 2015/0256613 A1* | 9/2015 | Walker | H04L 67/32 |
| | | | 709/217 |

\* cited by examiner

COMPUTER IMPLEMENTED METHOD FOR PROVIDING REAL-TIME INTERACTION BETWEEN FIRST PLAYER AND SECOND PLAYER TO COLLABORATE FOR MUSICAL PERFORMANCE OVER NETWORK

TECHNICAL FIELD

The present application generally relates to a method, an apparatus and software code for providing real-time interaction between a first player and a second player to collaborate for a musical performance over a network. The present application further relates to a method, an apparatus and software code for correcting errors of remote user input data.

BRIEF DESCRIPTION OF RELATED DEVELOPMENTS

Learning to play a music instrument and playing the instrument is common hobby and of interest for many people. However, playing alone is not satisfactory for all players.

Musicians often want to play together. It may be for the sake of band rehearsals, jamming or pure enjoyment, for example. Sometimes traveling to a same physical space, such as training room, can be time consuming or even impossible. Therefore musicians would like to have an option to play together online. Hearing each other's audio signals in real-time over a computer network when playing in different locations would improve the experience.

Some methods have been developed to provide a compromise between minimizing latency (having short delay in the receiving end safety buffer) while minimizing amount of data packets that do not arrive in time for playing because the latter causes audible dropouts (breaks in the audio) at the receiving end. Existing solutions are not satisfactory in performance and do not enable high-quality real-time online playing experience for musicians.

A user may want to play a musical instrument (or sing) along with a musical piece with remote user(s) over a public network, such as Internet.

However, there still exists a problem that low latency is critical in musical communication. Latency refers to the delay that it takes for a sound to travel from a player to another. That is the main reason why available solutions, such as Skype™ for example, is not optimal for musical communication. Based on some available research, musicians can play well in sync as long as latency is 25 ms or less, which is equivalent to distance of 8.5 meters between musicians in a shared room space, for example.

Thus, an easy to set-up, easy to use, and highly functional solution is needed to provide real-time interaction between a first player and a second player to collaborate for a musical performance over a network.

SUMMARY

According to a first example aspect of the disclosed embodiments there is provided a computer implemented method for providing real-time interaction between a first player and a second player to collaborate for a musical performance over a network, comprising:

maintaining a reference data item associated to at least a portion of a musical performance, the reference data item generated using a musical instrument performed by at least one user;

receiving first user input data generated using a first musical instrument performed by the first user, the received first user input data associated with the first musical instrument and the musical performance;

receiving second user input data generated using a second musical instrument performed by the second user, the received second user input data associated with the second musical instrument and the musical performance;

detecting a missing data packet within the received second user input data when generating real-time collaboration data for the musical performance;

replacing the missing data packet using the reference data item to correct the second user input data; and generating real-time collaboration data for the musical performance based on the corrected second user input data.

In an embodiment, the method further comprises generating real-time collaboration data for the musical performance based on the corrected second user input data and the first user input data, wherein the second user input data is received over the network from a second user device being remote to a first user device.

In an embodiment, the method further comprising:

receiving the reference data item from the second user device over the network, the reference data item being generated using the second musical instrument.

In an embodiment, the method further comprising:

receiving the reference data item from a system server over the network, the reference data item being generated using a third musical instrument performed by a third user.

In an embodiment, the method further comprising:

generating audible information by the first user device based on the second user input data for providing real-time interaction between the first player and the second player to collaborate for the musical performance over the network.

In an embodiment, the missing data packet within the received second user input data comprises a segment of audio data, and the method further comprising:

replacing the segment of the audio data to a portion of the reference data item of corresponding part of an earlier-recorded performance to provide corrected second user input data.

In an embodiment, the method further comprising:

maintaining the reference data item associated to at least a portion of a musical performance, the reference data item generated using a musical instrument performed by at least one user, wherein the reference data item comprising a plurality of corresponding audio data segments each corresponding to an earlier-recorded performance to provide available options for corrected second user input data.

In an embodiment, the method further comprising:

comparing harmonic content of the received second user input data with harmonic content of the plurality of corresponding audio data segments; and selecting at least one audio segment of the plurality of corresponding audio data segments based on the comparing step.

In an embodiment, the method further comprising:

selecting at least one audio segment of the plurality of corresponding audio data segments based on the comparing step to identify the at least one audio segment that matches best with immediate history of real-time audio of the second user input data that was still correctly received before the detected missed packet.

In an embodiment, the method further comprising:

generating a composite audio data segment using the selected at least one audio segment and immediate history of real-time audio of the second user input data that was still correctly received before the detected missed packet; and replacing the missing data packet using the composite audio data segment to correct the second user input data.

In an embodiment, the method further comprising:

comparing timestamps of the plurality of corresponding audio data segments; and selecting at least one audio segment of the plurality of corresponding audio data segments having most recent timestamp.

In an embodiment, the method further comprising:

receiving the missing data packet after the second user input data is corrected using the reference data item; and discarding the received missing data packet.

In an embodiment, the method further comprising:

receiving the missing data packet after the second user input data is corrected using the reference data item;

comparing harmonic content of the missing data packet with harmonic content of the reference data item used to correct the second user input data;

determining based on the comparing step that the missing data packet comprises speech data; and mixing the speech data to the generated real-time collaboration data.

In an embodiment, the first user device comprises a first clock and the second user device comprises a second clock, and the method further comprises:

receiving a synchronization message configured to synchronize the first clock with the second clock;

receiving click track information associated with the musical performance;

generating timing reference using the click-track information and the first clock;

generating audible information by the first user device based on the second user input data for providing real-time interaction between the first player and the second player to collaborate for the musical performance over the network; and providing the timing reference together with the audible information.

In an embodiment, the timing reference comprises at least one of the following: audio information, visual information and tactile information.

In an embodiment, the method further comprising:

generating collaboration data for the musical performance based on the first user input data and the corrected second user input data, wherein the first user input data and the corrected second user input data are synchronized when generating collaboration data using the click track information.

In an embodiment, the musical instrument comprising at least one of the following:

a tangible musical instrument played by a user; and a voice of a user.

According to a second example aspect of the disclosed embodiments there is provided an apparatus for providing real-time interaction between a first player and a second player to collaborate for a musical performance over a network, comprising:

a communication interface;

a user interface;

at least one processor; and at least one memory including computer program code;

the at least one memory and the computer program code configured to, with the at least one processor, cause the apparatus to:

maintain a reference data item associated to at least a portion of a musical performance, the reference data item generated using a musical instrument performed by at least one user;

receive first user input data generated using a first musical instrument performed by the first user, the received first user input data associated with the first musical instrument and the musical performance;

receive second user input data generated using a second musical instrument performed by the second user, the received second user input data associated with the second musical instrument and the musical performance;

detect a missing data packet within the received second user input data when generating real-time collaboration data for the musical performance;

replace the missing data packet using the reference data item to correct the second user input data; and generate real-time collaboration data for the musical performance based on the corrected second user input data.

In an embodiment, the apparatus further comprises a clock device and the at least one memory and the computer program code configured to, with the at least one processor, cause the apparatus to:

receive a synchronization message configured to synchronize the clock device with a second clock of a remote apparatus;

receive click track information associated with the musical performance;

generate timing reference using the click track information and the clock device;

generate audible information based on the second user input data for providing real-time interaction between the first player and the second player to collaborate for the musical performance over the network; and provide the timing reference together with the audible information.

According to a third example aspect of the disclosed embodiments there is provided a computer program embodied on a computer readable non-transitory medium comprising computer executable program code, which when executed by at least one processor of an apparatus, causes the apparatus to:

maintain a reference data item associated to at least a portion of a musical performance, the reference data item generated using a musical instrument performed by at least one user;

receive first user input data generated using a first musical instrument performed by the first user, the received first user input data associated with the first musical instrument and the musical performance;

receive second user input data generated using a second musical instrument performed by the second user, the received second user input data associated with the second musical instrument and the musical performance;

detect a missing data packet within the received second user input data when generating real-time collaboration data for the musical performance;

replace the missing data packet using the reference data item to correct the second user input data; and generate real-time collaboration data for the musical performance based on the corrected second user input data.

Different non-binding example aspects and embodiments of the disclosure have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The aspects of the disclosed embodiments will be described, by way of example only, with reference to the accompanying drawings, in which.

DETAILED DESCRIPTION

In the following description, like numbers denote like elements.

Figure 1:
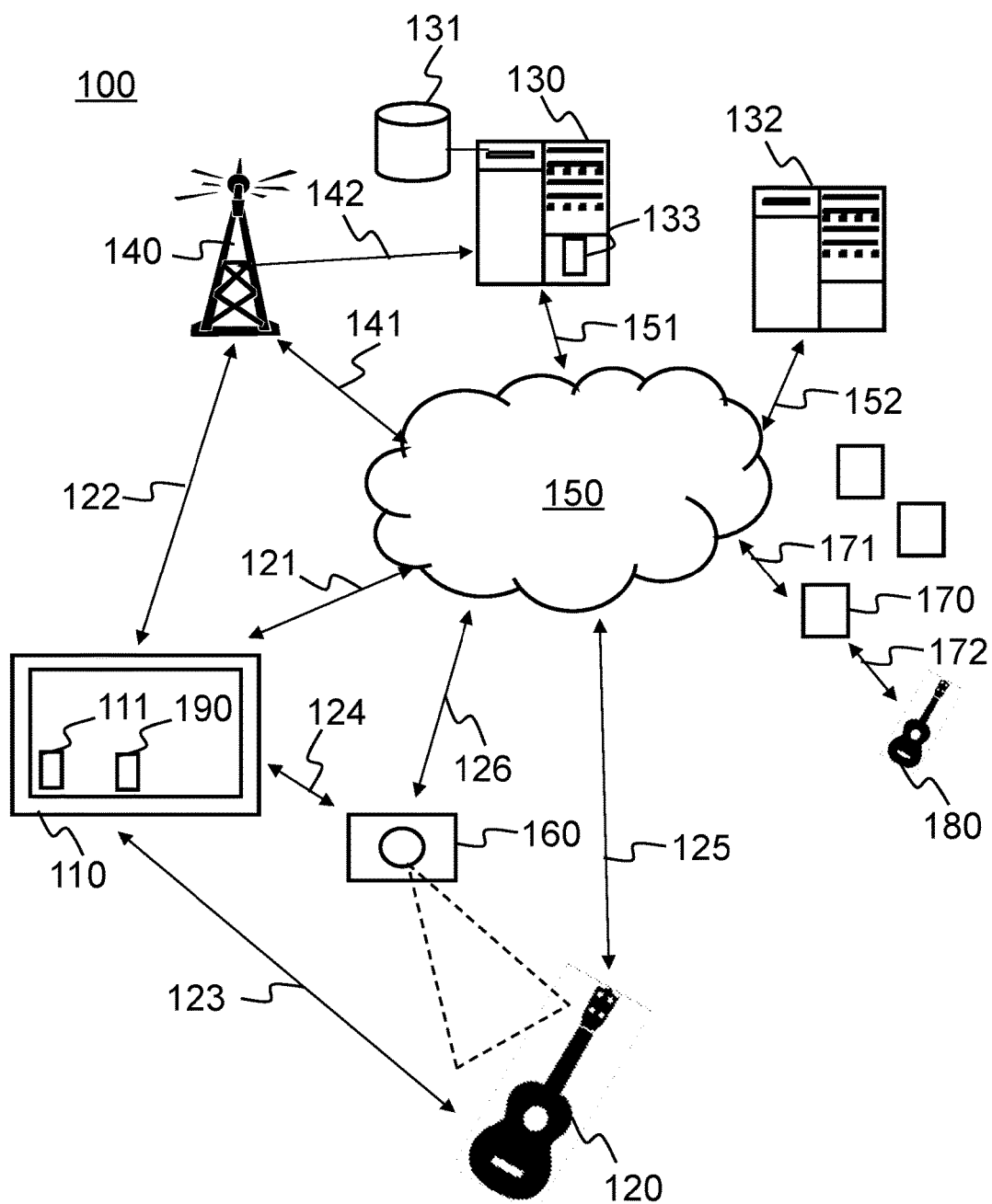
FIG. 1 shows a schematic picture of a system according to an aspect of the disclosed embodiments.

FIG. 1 shows a schematic picture of a system 100 according to an example embodiment. A first user device 110 may comprise a portable terminal comprising a communication interface, for example. The first user device 110 is capable of downloading and locally executing software program code. The software program code may be a client application 111 of a service whose possible server application 133 is running on a server apparatus 130, 132 of the system 100. The first user device 110 may comprise a capturing device 160, such as a camera and/or microphone for providing real time AV signals. The camera may also be used to provide video stream for a multimedia connection and a microphone may be used for providing audio stream for the multimedia connection, for example. The first user device 110 is configured to be connectable to a public network 150, such as Internet, directly via local connection 121 or via a wireless communication network 140 over a wireless connection 122. The wireless connection 122 may comprise a mobile cellular network or a wireless local area network (WLAN), for example. The wireless communication network 140 may be connected to a public data communication network 150, for example the Internet, over a data connection 141. The first user device 110 is configured to be connectable to the public data communication network 150, for example the Internet, directly over a data connection 121 that may comprise a fixed or wireless mobile broadband access. The wireless communication network 140 may be connected to a server apparatus 130 of the system 100, over a data connection 142.

In an embodiment, a first user device 110 (mobile phone, tablet, smart television or computer) sets up local connections 123, 124 with at least one of the capturing device 160 and a musical instrument 120. The capturing device 160 may be integrated to the first user device 110 or arranged as separate device and connectable over local connection 124.

The first user device 110 comprises a client application 111 and the capturing device 160 and/or the instrument 120 may just accept an invite (sent via a communication link locally or remotely over network 150) to join a session, for example.

The first user device 110 client application 111 may allow the first user device 110 to log into a music exercise service run on a server 130,132 for example. The first user device 110 may send invitation for collaboration to contacts maintained within the first user device 110.

Real-time interaction is provided between a first player operating the musical instrument 120 and a second player operating the musical instrument 180 to collaborate for a musical performance over a network 150.

A reference data item 190 is associated to at least a portion of a musical performance, the reference data item 190 is generated using a musical instrument 120, 180 performed by at least one user. The earlier performances recorded within the reference data item 190 do not need to come from the same user, but instead, performance(s) of song S may originate from other user(s). Such reference data may be used to substitute dropped-out audio segments. In that case, all users do not need to have previous performances of song S themselves.

Then again, instead of using earlier performance(s) as a direct substitute for the missing/dropout audio, the earlier performance(s) can be used together with the immediately history of the real-time audio that was still correctly received in order to generate a best-guess continuation for the latest still-correctly-received real-time audio. In other words, the earlier performances could be used to control a prediction-based error concealment algorithm, for example.

First user input data is received by the first user device 110, the data is generated using a first musical instrument 120 performed by the first user, the received first user input data is associated with the first musical instrument 120 and the musical performance.

Second user input data is received, the data is generated using a second musical instrument 180 performed by the second user, the received second user input data is associated with the second musical instrument 180 and the musical performance.

A missing data packet is detected by the first user device 110, for example by a client application 111, within the received second user input data when generating real-time collaboration data for the musical performance.

The missing data packet is replaced using the reference data item 190 to correct the second user input data.

Real-time collaboration data is generated, for example by the client application 111, for the musical performance based on the corrected second user input data. The real-time collaboration data is configured to reflect collaborated playing of the musical performance. Real-time collaboration data may also be generated, for example by the client application 111, for the musical performance based on the corrected second user input data and the first user input data.

In an embodiment, at least one of a user apparatus 110, 160, 170 or a server apparatus 130, 132 receives music track information and generates harmonic music track parameters based on the received music track information. Notation information may displayed at the user apparatus 110, 160,

170 for a user for performing the music track at a given time for the music track based on the harmonic music track parameters. The user may play a musical instrument 120, 180 such as a guitar or a user vocal. Harmonic user content generated by the musical instrument 120, 180 that is performed by the user is received using at least one capturing device 160. Real-time performance feedback is generated for the user based on comparison of the harmonic user content and the harmonic music track parameters according to predefined settings.

Remote second user device 170 is configured to transmit second user input data generated using a second musical instrument 180 performed by the second user, the received second user input data is associated with the second musical instrument 180 and the musical performance played in real-time with the first user over the public network 150. A plurality of second user devices 170 may participate the live on-line jamming session over the public network 150. The second user device 170 may be connected over local connection 171 to the public network 150 and over local connection 172 to the instrument 180.

The first user device 110 receives second user input data from the second user device 170. The second user input data may be processed by a client application 111 of the first user device 110 to detect a missing data packet within the received second user input data when generating real-time collaboration data for the musical performance. The missing data packet is replaced using the reference data item 190 to correct the second user input data and real-time collaboration data is generated for the musical performance based on the first user input data and the corrected second user input data, wherein the real-time collaboration data configured to reflect collaborated playing of the musical performance.

A capturing device 160 (e.g. a microphone and/or a camera) may capture and send a real time AV content to the first user device 110 over a peer-to-peer connection formed over a WiFi, mobile or other network, for example.

The first user device 110 may be connected to a plurality of different capturing devices 160 and instruments 120 and the first user device 110 may be configured to select which devices 120, 160, 170, 180 is actively collaborated with. For example, a user of the first user device 110 may control which stream (or streams) received from the devices 120, 160, 170, 180 is received by the first user device 110. The user of the user device 110 may choose one of the streams that the device 110 may decode and process for further processing.

In an embodiment, a second user device 170 may be similar to the first user device 110 and comprise corresponding elements and functionalities.

The first user device 110 may need to be logged in with user credentials to a chosen service of the network server 130,132.

In an embodiment, AV streams may be sent via a peer-to-peer connections 123, 124 from wireless device(s) 120, 160 to the first user device 110 (not via cloud server), or over mobile network or WiFi 122, 140. The connections 122, 123, 124 may be wireless or wired.

The first user device 110 may show all incoming real time AV streams on device 110 screen and the first user device 110 user may choose any available stream by e.g. clicking on it and utilizing the selected content.

In an embodiment, the system 100 comprises an instrument 120, 180 configured to be connectable to the user device 110, 170 over a local connection 123. The local connection 123 may comprise a wired connection or a wireless connection. The wired connection may comprise Universal Serial Bus (USB), High-Definition Multimedia Interface (HDMI), SCART interface or RCA interface, for example. The wireless connection may comprise acoustic connection, Bluetooth™, Radio Frequency Identification (RF-ID) or wireless local area network (WLAN), for example. Near field communication (NFC) may be used for device identification between the instrument 120 and the user device 110, for example. The instrument 120 may comprise a guitar, a vocal (human voice), a piano, an ukulele, a bass, a saxophone or a trumpet, for example. The instrument 120 may also be connected directly to the public network 150, such as Internet, via direct local connection 125 or via a wireless cellular network connection 140, 141.

In an embodiment, the system 100 comprises a capturing device 160 configured to be connectable to the user device 110 over a local connection 124. The local connection 124 may comprise a wired connection or a wireless connection. The wired connection may comprise Universal Serial Bus (USB), High-Definition Multimedia Interface (HDMI), SCART interface or RCA interface, for example. The wireless connection may comprise Bluetooth™, Radio Frequency Identification (RF-ID) or wireless local area network (WLAN), for example. Near field communication (NFC) may be used for device identification between the capturing device 160 and the user device 110, for example. The capturing device 160 may comprise a camera, a microphone, or a combination of a camera and a microphone, for example. The capturing device 160 may also be connected directly to the public network 150, such as Internet, via direct local connection 126 or via a wireless cellular network connection 140, 141.

In an embodiment, the system 100 may comprise a server apparatus 130, which comprises a storage device 131 for storing service data, service metrics and subscriber information, over data connection 151. The service data may comprise configuration data; account creation data; reference data items, user input data; real-time collaboration data; music track information; harmonic music track parameters; notation information; harmonic user content; performance feedback information, predefined settings, reference harmonic user content, instrument data, and attribute data, for example.

In an embodiment, a proprietary application in the user device 110 may be a client application 111 of a service whose server application 133 is running on the server apparatus 130 of the system 100.

Figure 5:
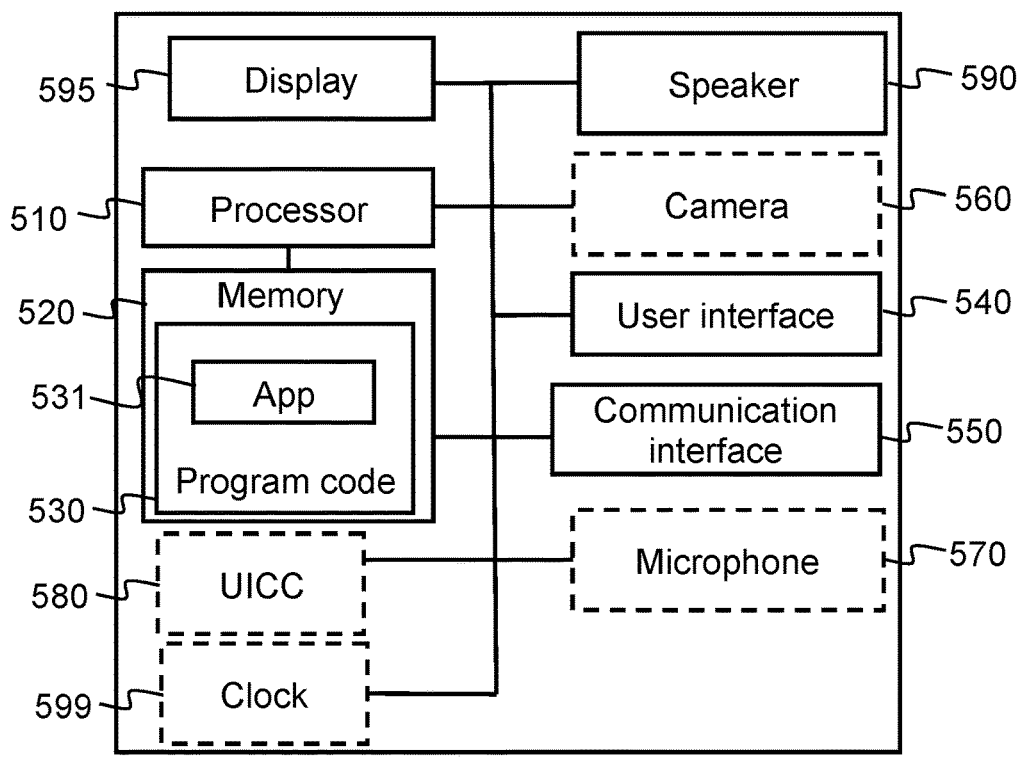
FIG. 5 presents an example block diagram of a user device.
Figure 6:
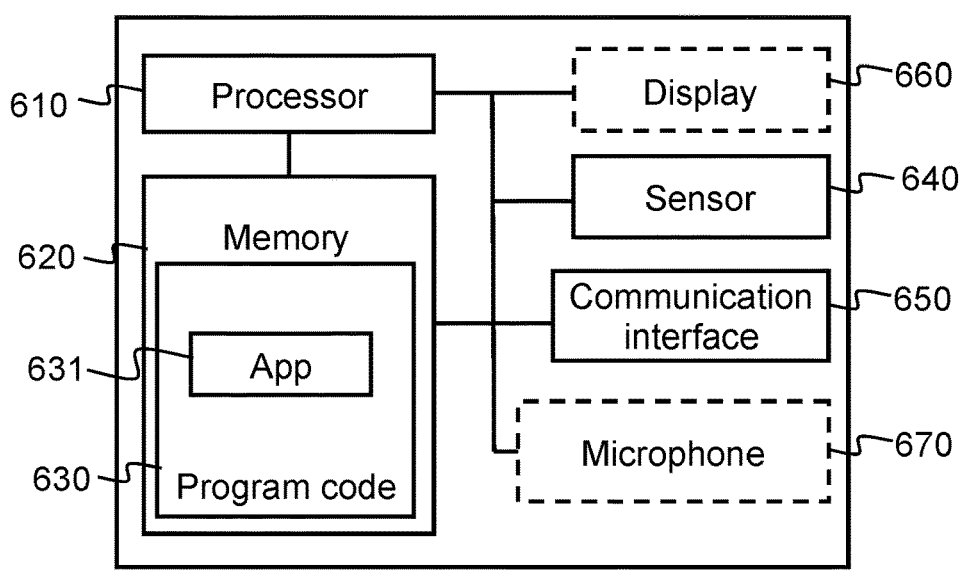
FIG. 6 presents an example block diagram of a capturing device.
Figure 7:
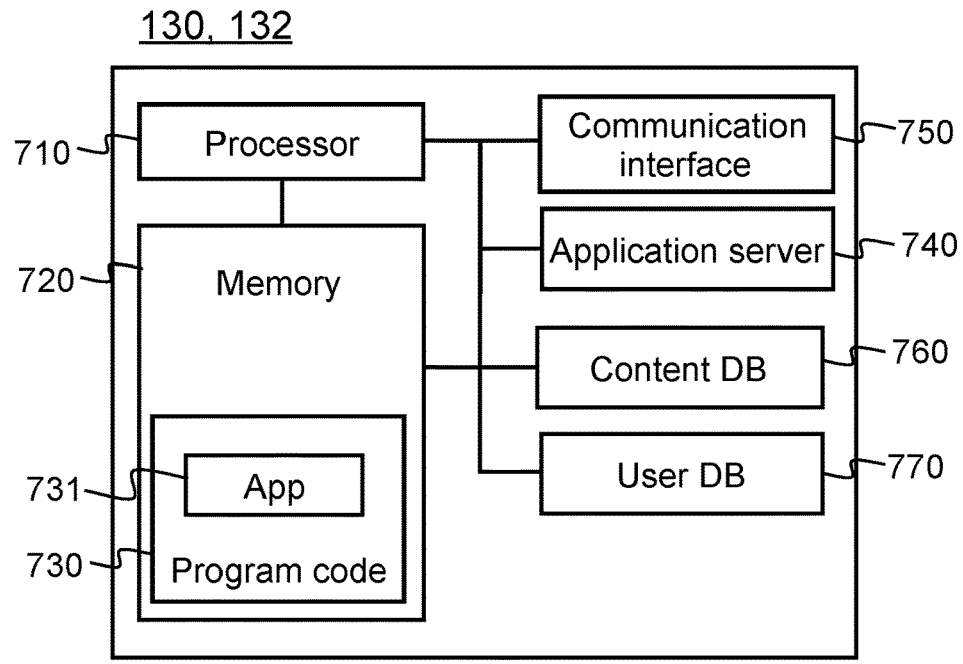
FIG. 7 presents an example block diagram of a system server.

For a user device 110, the client application 111 may comprise a simple webapp/website (or Android/IOS Native app, for example) configured to provide functionalities illustrated relating to FIGS. 5-7, for example.

The proprietary application 111 of the user device 110 may receive user input data and provide the user output data. The user input data may comprise real time audiovisual content captured by the capturing device 160, such as a microphone and/or camera. The microphone may be located in at least one of the capturing device 160, the instrument 120 or the user device 110, for example. Content may be transceived over local connections 123, 124, as shown. The local connection 123 may comprise an acoustic connection.

In an embodiment, configuration information or application download information for any of the user device 110, 170, the capturing device 160, the instrument 120, 180 and the system server 130 may be automatically downloaded and configured by the server 130. Thus the user of the devices 110, 120, 160, 170, 180 may not need to do any initialization or configuration for the service. The system server 130 may also take care of account creation process for the service, such as real time AV service between the user device 110 and the capturing device 160.

In an embodiment, the user device 110 and at least one of the capturing device 160 and the instrument 120 may be associated using one of many different methods, such as by entering a unique user ID or email address, by entering a unique token (which can be text or e.g. a QR code) or using, for example, some external service, such as Google's Nearby API which is a publish-subscribe API that lets you pass small binary payloads between internet-connected Android and iOS devices. Such devices do not have to be on the same local network, but they do have to be connected to the Internet 150. Nearby uses a combination of e.g. Bluetooth, Bluetooth Low Energy, Wi-Fi and near-ultrasonic audio to communicate a unique-in-time pairing code between devices. The server 130 may facilitate message exchange between devices 110, 120, 160 that detect the same pairing code. When a device detects a pairing code from a nearby device, it sends the pairing code to the Nearby Messages server 130 for validation, and to check whether there are any messages to deliver for the application's current set of subscriptions.

In an embodiment, the association of the devices 110, 120, 160, 170, 180 can be one-time or stored persistently on any of the devices 110, 120, 160, 170, 180 or the server 130, 132.

In an embodiment, the peer connection 124 between the capturing device 160 and the user device 110 can be two-way (even though captured AV content only goes from capturing device 160 to user device 110) because e.g. control commands or other messaging could be going in the other direction from user device 110 to the capturing device 160 over the peer connection.

In an embodiment, the real time session over connection 124 may comprise a real time WebRTC session or other similar live session.

In an embodiment, real time content captured by the capturing device 160 may comprise mixed content of both audio and video, for example.

In an embodiment, a system may comprise a master device 110, at least one slave device 120, 160 and a service server 130,132. The (e.g. wireless) slave(s) 120, 160 may capture AV content and send the AV content to the master device 110. However, the slave(s) 120, 160 can also send the AV content to the streaming service directly and the master device 110 may send selection information to the streaming service 130,132 to decide which slave output is received at a time. Such approach can be alternative for the master device 110 option.

In an embodiment, a user device 110 is configured to use a capturing device 160, such as a camera device for capturing video, and configured to use a microphone of the user device 110 for capturing audio relating to the instrument 120 played by the user.

In an embodiment, a user device 110 is configured to use a capturing device 160, such as a camera device for capturing video, and configured to use an audio input of the user device 110 for receiving audio captured by a microphone of the instrument 120 played by the user.

In an embodiment, a user has a client application 111 ("Music playing exercise app") installed in the user device 110. Optionally, corresponding client application(s) may be installed on a capturing device 160, second user device 170 and the instrument 120, 180 that can pair devices with the client application 111 to enable association of the devices 110, 120, 160, 170, 180 and to further provide enhanced service.

In an embodiment, the user device 110 and the capturing device 160 or the instrument 120 do not have to be connected locally for pairing. The user device 110 and the external devices 120, 160 can be paired also so that the user device 110 is connected to a mobile network over connection 121 and therefrom to the Internet 150 for example, and the external devices 120, 160, 170 are connected over local connections 125, 126 to a local WLAN network 140 or directly to the Internet 150 and eventually to the user device 100 for pairing, for example, even via the server 130.

In an embodiment, a capturing device 160 is mounted on the musical instrument 120 instead of using a capturing device integrated to the user device 110, or a capturing device mounted on a table, a floor or user's head, for example.

In an embodiment, authentication of a user device 110 on a system server 130 may utilize hardware or SIM credentials, such as International Mobile Equipment Identity (IMEI) or International Mobile Subscriber Identity (IMSI). The user device 110 may transmit authentication information comprising IMEI and/or IMSI, for example, to the system server 130. The system server 130 authenticates the user device 110 by comparing the received authentication information to authentication information of registered users stored at the system server database 131, for example. Such authentication information may be used for pairing the devices 110, 120, 160, 170, 180 to generate association between them for a jamming session connection.

In an embodiment, a peer-to-peer multimedia connection may be enabled by one of a multitude of client applications 111 that are components of a user device 110 application. Third party account credentials (usernames, passwords, etc.) may be hosted by the system server 130 and utilized when needed for exercising of playing a music instrument 120, for example.

In an embodiment, a service web application may be used for configuration of a system. The service web application may be run on any user device 110, admin device, or a remote control apparatus, such as a personal computer connected to a public data network, such as Internet 150, for example. The control apparatus may also be connected locally to the user device 110 over a local connection and utilize the network connections of the user device 110 for configuration purposes. The service web application of the control apparatus may provide searching/adding instruments, determining attributes for tracks, personalizing screen names, personalizing visual instructions, device setup and configuration such as Wi-Fi Setup and user device 110 configurations, for example. The service web application of the control apparatus may be a general configuration tool for tasks being too complex to be performed on the user interface of the user device 120, for example.

In an embodiment, a remote control apparatus may be authenticated and configuration data sent from the control apparatus to the system server 130, 131 wherein configuration settings for the user device 110, 170 are modified based on the received data. In an embodiment, the modified settings may then be sent to the user device 110, 170 over the network 150 and the local connection or the wireless operator. The modified settings may also be sent to external devices 120, 160, 180 correspondingly, through the user device 110, 170 or directly over the network 150, for example.

In an embodiment, the user device 110, 170 the instrument 120, 180 and a capturing device 160 may be wireless or wired.

In an embodiment, the first user device 110 comprises a first clock and the second user device 170 comprises a second clock, and a method further comprises receiving a synchronization message configured to synchronize the first clock with the second clock; receiving click track information associated with the musical performance; generating timing reference using the click-track information and the first clock; generating audible information by the first user device based on the second user input data for providing real-time interaction between the first player and the second player to collaborate for the musical performance over the network; and providing the timing reference together with the audible information. The click track information may be generated locally without receiving over network based on the start time and tempo information, for example.

Figure 2:
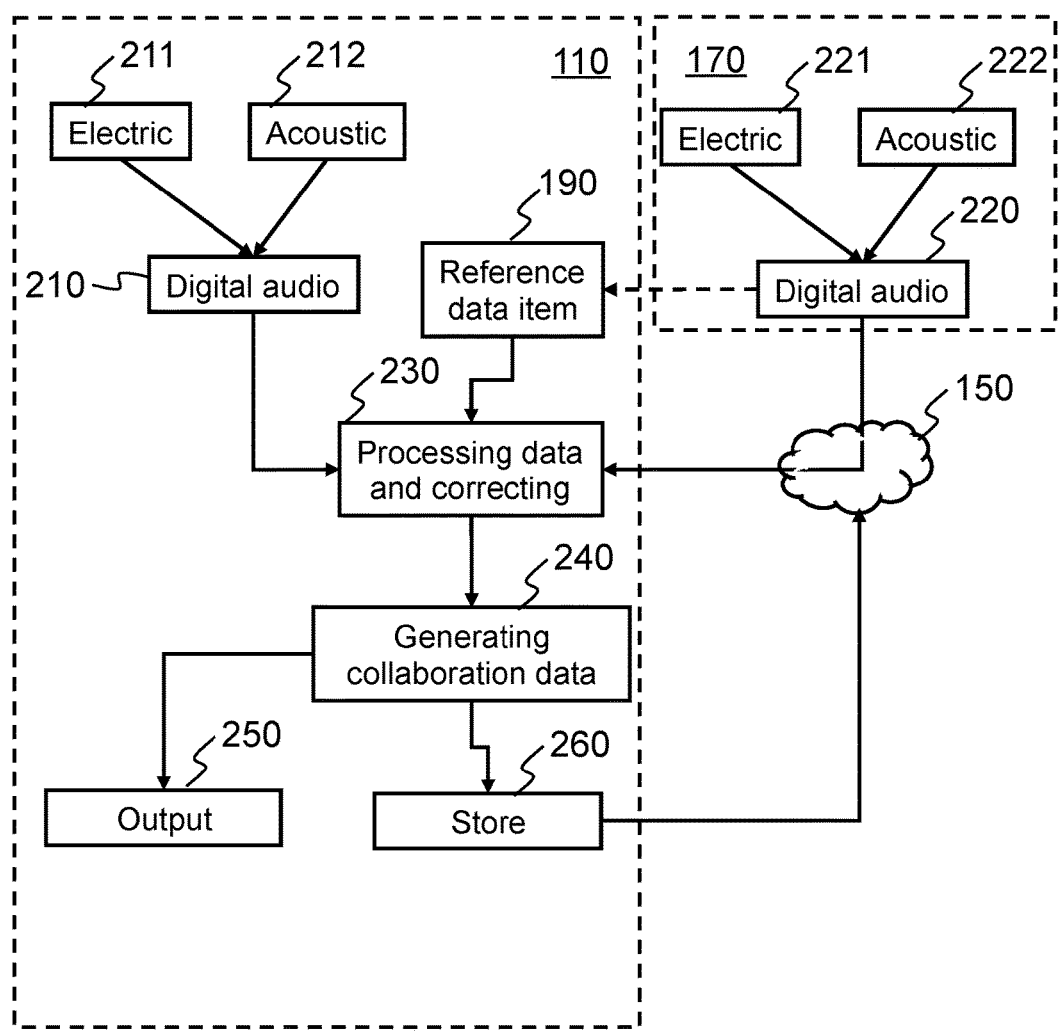
FIG. 2 shows a functional diagram of an exemplary method for providing real-time interaction between a first player and a second player to collaborate for a musical performance over a network in connection with an example embodiment.

FIG. 2 shows a functional diagram of an exemplary method for on-line jamming by a plurality of users and user devices over a public network in connection with an example embodiment. Real-time interaction between a first player and a second player is provided to collaborate for a musical performance over a network.

A reference data item 190 associated to at least a portion of a musical performance is maintained, for example within a first user device 110. The reference data item 190 may be generated using a musical instrument performed by at least one user. For example, the reference data item 190 may be originally generated by a second user device 170 and transmitted to the first user device 110 to be used as reference data item 190.

First user input data, such as digital audio 210 is generated using a first musical instrument 211, 212 performed by the first user. The received first user input data 210 is associated with the first musical instrument 211, 212 and the musical performance. The first musical instrument 211, 212 may comprise electric instrument 211 or acoustic instrument 212. The acoustic instrument may also comprise user vocal. Capturing device(s) may be used to capture acoustic signals and to convert them to digital audio 210.

Second user input data, such as digital audio 220 is generated using a second musical instrument 221, 222 performed by the second user. The received second user input data 220 is associated with the second musical instrument 221, 222 and the musical performance. The second musical instrument 221, 222 may comprise electric instrument 221 or acoustic instrument 222. The acoustic instrument may also comprise user vocal. Capturing device(s) may be used to capture acoustic signals and to convert them to digital audio 220.

The second user input data 220 (digital audio data) may be maintained in a cloud server and made downloadable to any first user device 110 for reference data item 190. Alternatively, the second user input data 220 may be transmitted directly to the first user device 110 for reference data item 190.

While playing together (first user device 110 and second user device 170) a real-time collaboration musical performance latencies in online communication are due to three main reasons:

1. Audio coding latency: in practice audio waveforms have to be compressed (when generating digital audio 210, 220) before transmitting them to peer device. Typically audio is compressed in 5-20 ms long frames (packets) and the encoder has to wait until the frame is filled before sending it.

2. Speed of light: electrical signals can travel (through network 150) only about 7000 km in 25 ms.

3. Network latencies: internet-like digital networks (210, 220, 150) involve delays caused by routing, network congestion, etc.

Factors 1 and 2 can be controlled: audio encoding delay can be pushed small enough, and collaborating musicians are usually close enough geographically. But factor 3 is more problematic: not only because network latencies are often large, but because network latency constantly varies and is in some level unpredictable. In order that the receiving end (e.g. first user device 110) can play non-interrupted continuous audio (sent from second user device 170), the receiving end (e.g. first user device 110) has to apply an additional "safety" buffer that delays the received audio 220 for a short while before playing it. The safety buffer (arranged in processing block 230) guarantees that each data packet of the received second user input data 220 has arrived in time before it is scheduled to be played at the receiving end (at first user device 110). Its delay may be set up according to worst-case latency.

Processing means 230 of the first user device 110 detects a missing data packet within the received second user input data 220 when generating real-time collaboration data for the musical performance and replaces the missing data packet using the reference data item 190 to correct the received second user input data 220.

Corrected second user input data 220 is then sent with the first user input data to collaboration data block 240. The collaboration data block 240 generates real-time collaboration data for the musical performance based on the first user input data 210 and the corrected second user input data 220, and the real-time collaboration data configured to reflect collaborated playing of the musical performance.

In an embodiment, the step of generating collaboration data 240 may also be simplified. The step of processing data and correcting 230 feed may be in such scenario fed through by the generating collaboration data 240 step to output 250. That would be the case when a first user just wants to hear the remote end user in real time, while the digital audio of the first user can be heard directly at the near end (the first user does not need the communication system to hear his own audio). Thus, generating collaboration data 240 step would merely pass through the corrected data of the second user.

In one exemplary use case, a device of the first user plays back audible information of the second user only. Then the "collaborated playing" must not always include audio from the first user also. Similar to Skype conversation, for example, audio may be received from the remote end and played back at the near end. However audio from the near end does not necessarily need to be played back at the near end or mixed with the audio of the remote end.

The real-time collaboration data generated in block 240 may be output 250, for example played by the first user device 110 output means to enable the first user to hear also remote second user playing. The real-time collaboration data generated in block 240 may also be stored 260 within the first user device 110 and/or transmitted to a cloud server within the network 150, or through the network 150 to the second user device 170, for example.

The users may want to record their joint performance and listen to it afterwards. Because the performances may have taken place using universally-synced click/backing tracks (see e.g. FIG. 4), the performances recorded separately on each device 110, 170 can be mixed together with perfect zero-latency alignment with each other (up to the clock synchronization accuracy). In other words, although the users hear each other with a small delay during the real-time online play-together, the recording/down mix in the end is free of all latencies (or synchronization errors) provided that the clock synchronization is accurate.

There are different embodiments to improve subjective quality of musical communication over a computer network 150.

First, it is noted that musical performances are more predictable than speech signals in certain situations. That is because the musicians have often already performed the same song earlier, for example while rehearsing. The earlier performances can be used as reference data item 190 to substitute dropped-out audio at the receiving end (e.g. first user device 110), or to perform high-quality error concealment. That, in turn, allows lower latencies when worst-case latencies are not the determining factor for the safety buffer delay in the receiving end (e.g. first user device 110).

Second, clock synchronization between user devices 110, 170 may be used in order to play a click-track/backing track exactly simultaneously on all user devices 110, 170. The click/backing track may serve two purposes: it makes slight delay in other users' performance(s) less noticeable and it ensures that the performers' musical timing will not drift.

Figure 3:
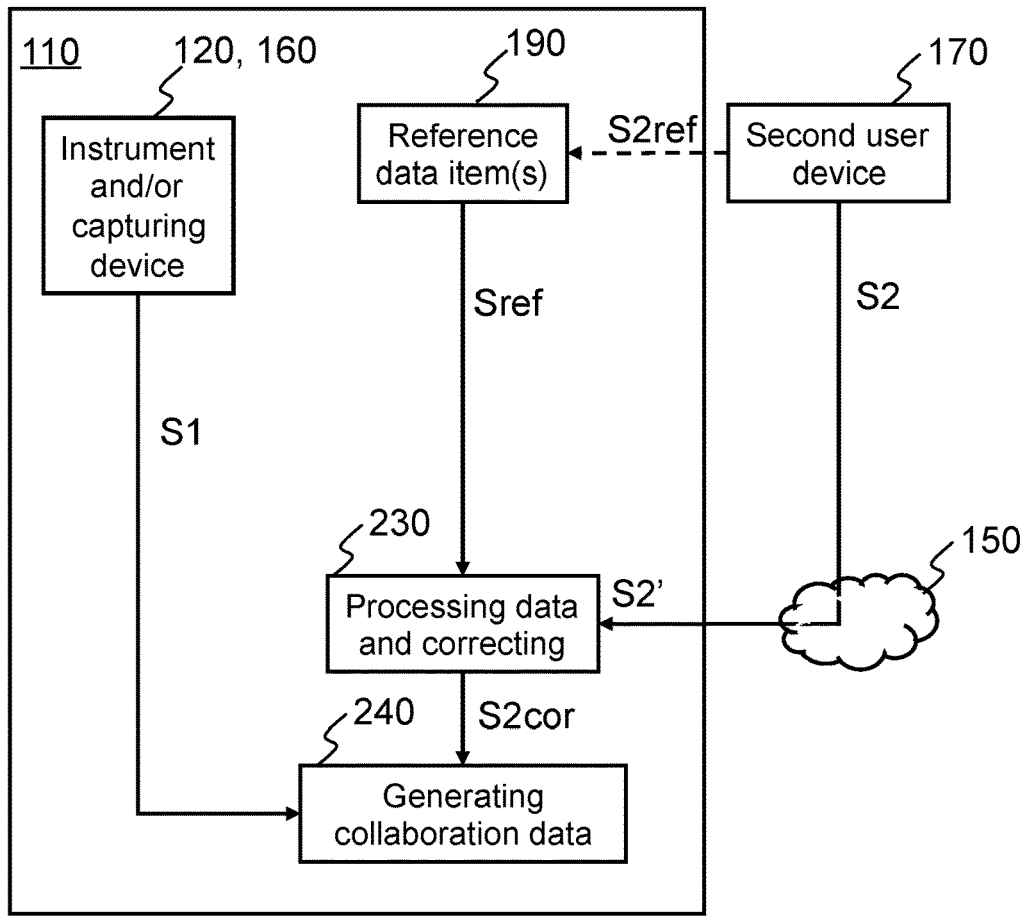
FIG. 3 shows a flow diagram of an exemplary method for real-time interaction between a first player and a second player to collaborate for a musical performance over a network.
Figure 3:
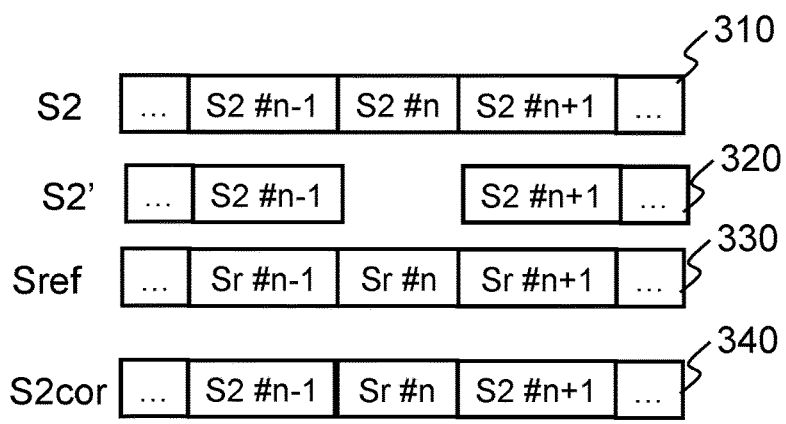

FIG. 3 shows a flow diagram of an exemplary method for real-time interaction between a first player and a second player to collaborate for a musical performance over a network.

Two or more users operating corresponding user devices 110, 170 may want to play a specific song S together. The user devices 110, 170 are not in same physical space, so they want to hear each other's performance audio over the public network 150, such as Internet.

The users may have rehearsed or otherwise played the song S at least once before the online play-together. The second user device 170 may have generated a reference input data S2*ref* and transmitted the reference input data S2*ref* to cloud server or to the first user device 110 over the network 150. The reference input data S2*ref* may correspond to S2 shown in FIG. 3 lower part. It is possible for the second user device 170 to generate a plurality of earlier performance(s) that have been recorded and sent to the other party, such as the first user device 110, before the play-together.

Latency is important parameter in view of on-line audio connection over the network 150. Sometimes data packets drop out or arrive too late to the other end. In real-time audio communication that causes audible errors that may also be called "dropouts".

In an embodiment, the previously-recorded performances may be used to conceal the errors and/or dropouts. A reference data item S2*ref* is associated to at least a portion of a musical performance, and the reference data item S2*ref* is generated using a musical instrument performed by at least one user, such as the second user.

Second user input data S2 shown as data 310 is generated using a second musical instrument performed by the second user, the received second user input data S2 is associated with the second musical instrument and the musical performance and may transmitted to the network 150 by the second user device 170.

First user input data S1 is generated using a first musical instrument performed by the first user, the received first user input data S1 is associated with the first musical instrument and the musical performance.

In step 230, at the first user device 110 second user input data S2' shown as data 320 is received and it may be detected a missing data packet within the received second user input data S2' when generating real-time collaboration data for the musical performance. As an example shown in FIG. 3, the received second user input data S2' misses packet/segment identified as "S2 #n". When having the reference data item 190 available for the first user device 110, it is possible to replace the missing data packet "S2 #n" with "Sr #n" using the reference data item Sref shown as data 330 to correct the second user input data S2' and generate corrected second user input data S2*cor* shown as data 340.

Real-time collaboration data may be generated in step 240 for the musical performance based on the first user input data S1 and the corrected second user input data S2*cor*, wherein the real-time collaboration data is configured to reflect collaborated playing of the musical performance.

Thus, when a segment of audio goes missing in S2, it is substituted with the corresponding part of an earlier-recorded performance data S2*ref*, Sref that is then played at the receiving end device 110 instead of the missing/dropped-out audio. If there are multiple earlier performances maintained within the reference data item 190, the one is selected that matches best the immediately history of the real-time audio S2' that was still correctly received. Alternatively, a performance is chosen that is the most recent among the reference data 190 of available performances.

Sometimes the missing/dropped out audio data segment/packet "S2 #n" still arrives, but too late for on-line collaboration. Often, in that case, the too-late-arriving audio may be simply discarded as it was already replaced by a segment "Sr #n" from a previous performance data Sref. However, if the too-late-arriving audio contains some unpredictable data that does not match the earlier recorded performance data S2*ref*, Sref that was used instead—for example speech from the second user—it could still be used and played for the first user. The late received packet can be seamlessly mixed on top of the otherwise error-concealed real-time audio S2*cor* so as to retain smooth and continuous experience but to include the "surprising" element (such as speech) on top of the error-concealed real-time audio S2*cor*. The mixing of too-late-arriving audio would be continued as long as the surprising element persists in it (such as to finish of the speech sentence).

In an embodiment, the missing data packet "S2 #n" is received after the second user input data S2' is corrected using the reference data item Sref. Harmonic content of the received data packet "S2 #n" may be compared with harmonic content of the reference data item Sref used to correct the second user input data S2'. Based on the comparing step it may be determined that the missing data packet "S2 #n" comprises speech data, and the speech data may be mixed to the generated real-time collaboration data in step 240.

In an embodiment, the reference data item Sref may be received from a system server over the network 150, and the reference data item Sref may be generated using a third musical instrument performed by a third user (not shown).

In an embodiment, the first user device 110 generates audible information based on the second user input data S2*cor* for providing real-time interaction between the first player and the second player to collaborate for the musical performance over the network 150.

The reference data item 190 is associated to at least a portion of a musical performance, and the reference data item 190 may be generated using a musical instrument performed by at least one user, wherein the reference data item 190 comprises a plurality of corresponding audio data segments each corresponding to an earlier-recorded performance to provide available options for corrected second user input data S2*cor*.

In an embodiment, the method may further comprise comparing harmonic content of the received second user input data S2' with harmonic content of the plurality of corresponding audio data segments within the reference data item 190. The method further comprises selecting at least one audio segment Sref of the plurality of corresponding audio data segments based on the comparing step.

At least one audio segment of the plurality of corresponding audio data segments 190 may be selected based on the comparing step to identify the at least one audio segment Sref that matches best with immediate history of real-time audio of the second user input data S2' that was still correctly received before the detected missed packet S2 #n.

Furthermore, a composite audio data segment may be generated using the selected at least one audio segment and immediate history of real-time audio of the second user input data that was still correctly received before the detected missed packet, and the missing data packet replaced using the composite audio data segment to correct the second user input data.

In an embodiment, segments of data have timestamps and the method further comprises comparing timestamps of the plurality of corresponding audio data segments, and selecting at least one audio segment of the plurality of corresponding audio data segments having most recent timestamp.

Figure 4:
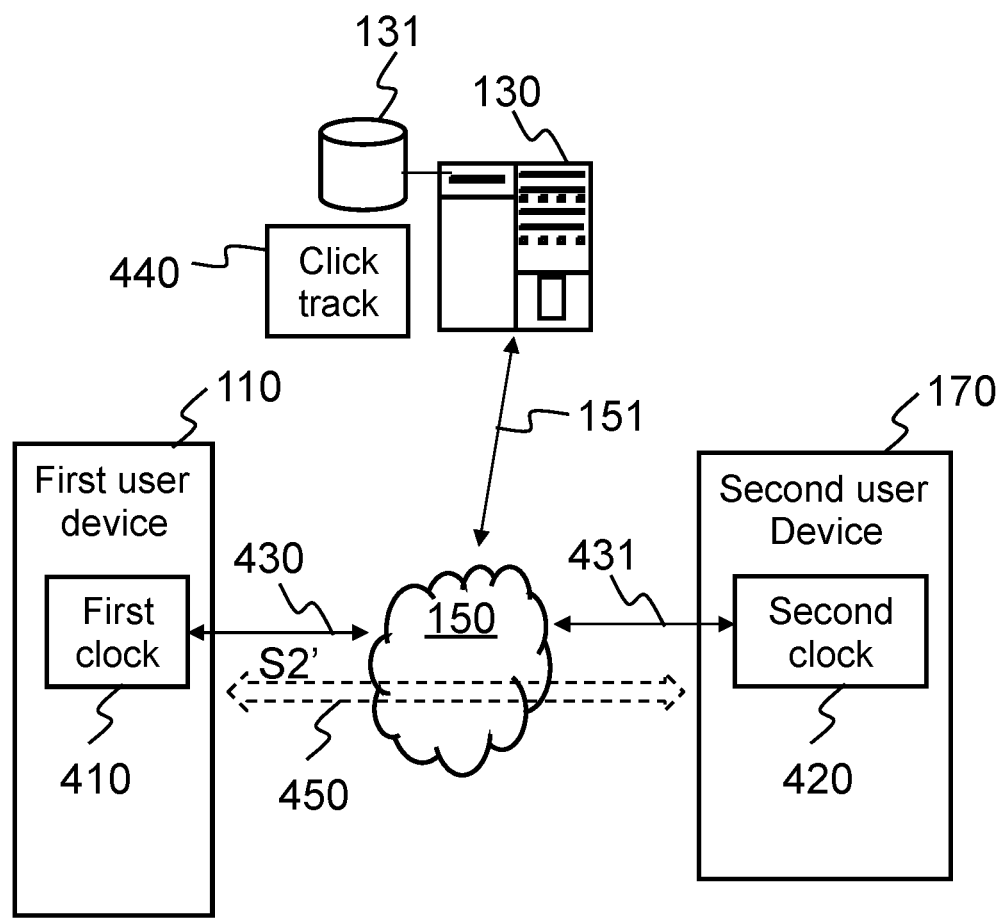
FIG. 4 illustrates a block diagram of synchronization between user devices in accordance with an example embodiment.

FIG. 4 illustrates a block diagram of synchronization between user devices 110, 170 in accordance with an example embodiment. The public network 150 provides data communication between remote devices 110, 170 and system server 130.

In an embodiment, the first user device 110 comprises a first clock 410 and the second user device 170 comprises a second clock 420, and the method further comprises receiving a synchronization message 430, 431 configured to synchronize the first clock 410 with the second clock 420. The method further comprises receiving click-track information 440, e.g. from a system server 130 over data connection 151 and network 150, associated with the musical performance. The method further comprises generating timing reference using the click track information 440 and the first clock 410, generating audible information by the first user device 110 based on the second user input data S2' illustrated as item 450 transceived between devices 110, 170 for providing real-time interaction between the first player and the second player to collaborate for the musical performance over the network 150, and providing the timing reference together with the audible information.

In an embodiment, the timing reference comprises at least one of the following: audio information, visual information and tactile information.

In an embodiment, the method further comprising generating collaboration data for the musical performance based on the first user input data S1 (see FIG. 3) and the corrected second user input data S2cor (See FIG. 3), wherein the first user input data S1 (see FIG. 3) and the corrected second user input data S2cor are synchronized when generating collaboration data using the click-track information 440.

Before online play-together session, the two user devices 110, 170 synchronize the internal clocks 410, 420 of the devices by using a clock synchronization algorithm, known as such.

When one of the user of user devices 110, 170 starts playing a song S, the other user(s) can hear that user's performance audio and in addition, the client application (see 111 in FIG. 1, for example) running on all the users devices 110, 170 will receive a message 430, 431 telling the exact (universal/synced) time when the first user started playing the song. Thus, other user(s) can join the playing at any time, and the effective starting time of the song will be the same for all of them: in other words every user is at the same point of the song all the time.

In addition to hearing the performances of the other users, each user also hears a click-track or backing track associated with the played song. Because the clocks 410, 420 of the user devices 110, 170 have been synchronized, all users have their click/backing track playing exactly in sync (with no latencies or variation, up to the clock synchronization accuracy). That provides at least following benefits.

First, the click-track/backing track sounds partly mask the onsets/beginnings of the musical sounds that other users perform. That makes it harder to notice that there is a small (network) latency in the received audio.

Second, timing does not start to drift: If the users would hear only each other and not the universally-synced click/backing track, it might happen that user A slows down a bit because he hears user B dragging behind (due to the latency). Likewise, user B would slow down a bit because he/she hears user A with some latency. That may cause drift in musical timing.

FIG. 5 presents an example block diagram of a user device 110, 170, in which various aspects of the disclosed embodiments may be applied. The user device 110 may be a user equipment (UE), user device or apparatus, such as a mobile terminal, a smart phone, a smart TV, a phablet, a tablet, or other communication device comprising a communication interface and a user interface.

The general structure of the user device 110 comprises a user input device 540, a communication interface 550, a microphone 570, a camera 560, a processor 510, and a memory 520 coupled to the processor 510. The user device 110 further comprises software 530 stored in the memory 520 and operable to be loaded into and executed in the processor 510. The software 530 may comprise one or more software modules, such as a music instrument training module 531 that may comprise a client application for maintaining a reference data item associated to at least a portion of a musical performance, the reference data item generated using a musical instrument performed by at least one user; receiving first user input data generated using a first musical instrument performed by the first user, the received first user input data associated with the first musical instrument and the musical performance; receiving second user input data generated using a second musical instrument performed by the second user, the received second user input data associated with the second musical instrument and the musical performance; detecting a missing data packet within the received second user input data when generating real-time collaboration data for the musical performance; replacing the missing data packet using the reference data item to correct the second user input data; and generating real-time collaboration data for the musical performance based on the first user input data and the corrected second user input data, the real-time collaboration data configured to reflect collaborated playing of the musical performance.

The music instrument training module 531 can be in the form of a computer program product. The user device 110 may further comprise a universal integrated circuit card (UICC) 580.

In an embodiment, the user device 110 may comprise a display 595 for presenting information to a user of the device 110. In case the user device 110 does not comprise the display 595, an external A/V apparatus may be used for presenting information.

The processor 510 may be, e.g., a central processing unit (CPU), a microprocessor, a digital signal processor (DSP), a graphics processing unit, or the like. FIG. 5 shows one processor 510, but the user device 110 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The user device 110 may comprise a plurality of memories. The memory 520 may be constructed as a part of the user device 110 or it may be inserted into a slot, port, or the like of the user device 110 by a user. The memory 520 may serve the sole purpose of storing data, or it may be constructed as a part of an apparatus serving other purposes, such as processing data. Client application data for different services provided by service providers may be stored and run in the memory 520 as well as other user device 110 application data. A client application 111 is one such software application run by the processor with the memory.

The user input device 540 may comprise circuitry for receiving input from a user of the user device 110, e.g., via a keyboard, a touch-screen of the user device 110, speech recognition circuitry, gesture recognition circuitry or an accessory device, such as a headset or a remote controller, for example.

The camera 560 may be a still image camera or a video stream camera, capable for creating multimedia data. The device 110 may comprise several cameras, for example a front camera and a rear camera, or an internal camera and an external camera. The user of the device 110 may select the used camera 560 via settings of the device 110 or the client application within the device 110.

The speaker 590 is configured to notify a user of and to provide other user alarm sounds. The speaker 590 also allows the user hear the track to be played with the instrument 120.

The microphone 570 is configured to capture audio stream of the user playing the instrument 120, for example.

In an embodiment, the microphone 570 may be used to disable the speaker 590 when identical audio output is detected, using the microphone 570, from an external source, such as the capturing device 160. The device speaker 590 may only be required when the capturing device 160 microphone is switched off or operating at very low volumes. The identical audio output may be detected based on audio data comparison and based on distance calculation the audio data source may be determined to be the user device 110 instead of the instrument 120 and the speaker 590 may be switched off automatically.

In an embodiment, the universal integrated circuit card (UICC) 580 is the smart card used in mobile terminals in GSM, UMTS or 5G networks. The UICC 580 ensures the integrity and security of all kinds of personal data, and it typically holds a few hundred kilobytes. In a GSM network, the UICC 580 contains a SIM application and in a UMTS network the UICC 580 contains a USIM application, for example. The UICC 580 may contain several applications, making it possible for the same smart card to give access to both GSM and UMTS/5G networks, and also provide storage of a phone book and other applications. It is also possible to access a GSM network using a USIM application and it is possible to access UMTS/5G networks using a SIM application with mobile terminals prepared for this.

The communication interface module 550 implements at least part of data transmission. The communication interface module 550 may comprise, e.g., a wireless or a wired interface module. The wireless interface may comprise such as a WLAN, Bluetooth, infrared (IR), radio frequency identification (RF ID), NFC, GSM/GPRS, CDMA, WCDMA, LTE (Long Term Evolution) or 5G radio module. The wired interface may comprise such as universal serial bus (USB), HDMI, SCART or RCA, for example. The communication interface module 550 may be integrated into the user device 110, or into an adapter, card or the like that may be inserted into a suitable slot or port of the user device 110. The communication interface module 550 may support one radio interface technology or a plurality of technologies. The communication interface module 550 may support one wired interface technology or a plurality of technologies. The user device 110 may comprise a plurality of communication interface modules 550. A clock device 599 may be used for synchronizing on-line performing of musical performance and click-track information may be used together with clock device 599.

A skilled person appreciates that in addition to the elements shown in FIG. 5, the user device 110 may comprise other elements, such as additional microphones, extra speakers, extra cameras, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the user device 110 may comprise a disposable or rechargeable battery (not shown) for powering when external power if external power supply is not available.

In an embodiment, the user device 110 comprises speech or gesture recognition means. Using these means, a predefined phrase or a gesture may be recognized from the speech or the gesture and translated into control information for the user device 110, for example.

FIG. 6 presents an example block diagram of capturing device 160 in which various aspects of the disclosed embodiments may be applied. The capturing device 160 may be a microphone device or a camera device comprising a communication interface.

The general structure of the capturing device 160 comprises a communication interface 650, a processor 610, and a memory 620 coupled to the processor 610. The capturing device 160 further comprises software 630 stored in the memory 620 and operable to be loaded into and executed in the processor 610. The software 630 may comprise one or more software modules, such as music instrument capturing module 631 that may be comprised by a client application, and can be in the form of a computer program product.

The capturing device 160 may further comprise a display 660 and a microphone 670.

The processor 610 may be, e.g., a central processing unit (CPU), a microprocessor, a digital signal processor (DSP), a graphics processing unit (GPU), or the like. FIG. 6 shows one processor 610, but the capturing device 160 may comprise a plurality of processors.

The memory 620 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The capturing device 160 may comprise a plurality of memories. The memory 620 may be constructed as a part of the capturing device 160 or it may be inserted into a slot, port, or the like of the capturing device 160 by a user. The memory 620 may serve the sole purpose of storing data, or it may be constructed as a part of an apparatus serving other purposes, such as processing data.

The sensor 640 may comprise an imaging sensor used for still image or video stream capturing.

In an embodiment, the capturing device 160 may further comprise loudspeaker or multiple loudspeakers with wired or wireless connections. Furthermore, the speaker(s) may comprise a jack for headphones and the headphones.

The display 660 may comprise a LED screen, a LCD screen or a plasma screen, with touch sensitive features or without, for example.

The communication interface module 650 implements at least part of data transmission. The communication interface module 650 may comprise, e.g., a wireless or a wired interface module. The wireless interface may comprise such as a WLAN, Bluetooth, infrared (IR) or radio frequency identification (RF ID) radio module. The wired interface may comprise such as universal serial bus (USB), HDMI, SCART or RCA, for example. The communication interface module 650 may be integrated into the capturing device 160, or into an adapter, card or the like that may be inserted into a suitable slot or port of the capturing device 160. The communication interface module 650 may support one radio interface technology or a plurality of technologies. The capturing device 160 may comprise a plurality of communication interface modules 650.

A skilled person appreciates that in addition to the elements shown in FIG. 6, the capturing device 160 may comprise other elements, such as microphones, speakers, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the capturing device 160 may comprise a disposable or rechargeable battery (not shown) for powering when external power if external power supply is not available.

FIG. 7 presents an example block diagram of a system server 130, 132 in which various aspects of the disclosed embodiments may be applied.

The general structure of the system server 130 comprises a processor 710, and a memory 720 coupled to the processor 710. The server 130 further comprises software 730 stored in the memory 720 and operable to be loaded into and executed in the processor 710. The software 730 may comprise one or more software modules such as music instrument training module 731 that may be used for music track training service and can be in the form of a computer program product.

The processor 710 may be, e.g., a central processing unit (CPU), a microprocessor, a digital signal processor (DSP), a graphics processing unit, or the like. FIG. 7 shows one processor 710, but the server 130, 132 may comprise a plurality of processors.

The memory 720 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The system server 130 may comprise a plurality of memories. The memory 720 may be constructed as a part of the system server 130 or it may be inserted into a slot, port, or the like of the system server 130. The memory 720 may serve the sole purpose of storing data, or it may be constructed as a part of an apparatus serving other purposes, such as processing data.

The communication interface module 750 implements at least part of data transmission. The communication interface module 750 may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. The communication interface module 750 may be integrated into the server 130, or into an adapter, card or the like that may be inserted into a suitable slot or port of the system server 130. The communication interface module 750 may support one radio interface technology or a plurality of technologies.

Configuration information between the user device 110 and the system server 130 may be transceived using the communication interface 750. Similarly, account creation information between the system server 130 and a service provider may be transceived using the communication interface 750.

An application server 740 provides application services e.g. relating to the user accounts stored in a user database 770 and to the service information stored in a service database 760.

A skilled person appreciates that in addition to the elements shown in FIG. 7, the system server 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 8:
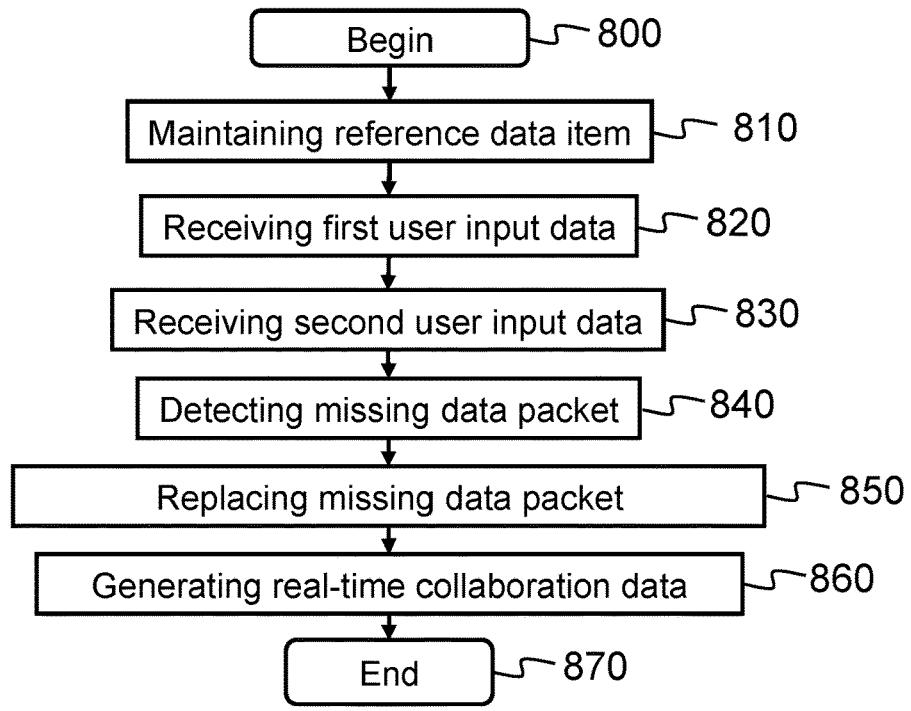
FIG. 8 shows a flow diagram showing operations in accordance with an aspect of the disclosed embodiments.

FIG. 8 shows a flow diagram showing operations in accordance with an example embodiment. In step 800, a computer implemented method for providing real-time interaction between a first player and a second player to collaborate for a musical performance over a network is started.

In step 810, a reference data item associated to at least a portion of a musical performance is maintained, the reference data item being generated using a musical instrument performed by at least one user.

In step 820, first user input data generated using a first musical instrument performed by the first user is received, the received first user input data being associated with the first musical instrument and the musical performance.

In step 830, second user input data generated using a second musical instrument performed by the second user is received, the received second user input data being associated with the second musical instrument and the musical performance.

In step 840, a missing data packet detected within the received second user input data when generating real-time collaboration data for the musical performance.

In step 850, the missing data packet is replaced using the reference data item to correct the second user input data.

In step 860, real-time collaboration data is generated for the musical performance based on the corrected second user input data. The method is ended in step 870.

The hardware implementation of the apparatus or system may comprise different types of microphones, cameras, displays, and computing devices, or a mobile phone, for example. A computer with a USB microphone/webcam may also be used.

Without in any way limiting the scope, interpretation, or application of the claims appearing below, a technical effect of one or more of the example embodiments disclosed herein is an improved system for music instrument (including vocal) 120, 180 exercise for a music track playing.

A technical effect of one or more of the example embodiments disclosed herein is that on-line collaboration for playing together a musical performance (e.g. on-line jamming) is improved.

A technical effect of one or more of the example embodiments disclosed herein is that error concealment is improved.

A further technical effect of one or more of the example embodiments disclosed herein is that error concealment using earlier performances allows shortening the "safety buffer" in the receiving end and hence lowering the overall communication latency significantly. This is because too-late-arriving audio packets do not cause too disturbing effects in the audio signal. Delay of the safety buffer does not need to be set according to worst-case latency (for individual audio packets), but according to "most of the time" latency.

A further technical effect of one or more of the example embodiments disclosed herein is that synchronized click-track/backing track played on the devices of all users serves two purposes: a) It makes the slight delay in other users' performance(s) less noticeable because the note starts in other users' performances are partly masked by the sounds of the backing track, and b) it ensures that the performers' musical timing will not drift.

A further technical effect of one or more of the example embodiments disclosed herein is that accuracy of the user's performance (and the accuracy of the analysis of the accompanying song) is improved. Furthermore, the accuracy is further improved when the number of reference performances increases.

Another technical effect of one or more of the example embodiments disclosed herein is an improved music instrument exercise system. Another technical effect of one or more of the example embodiments disclosed herein is improved combination of a plurality of harmonic data contents. Another technical effect of one or more of the example embodiments disclosed herein is the provision of a simplified and reliable system for providing a online jamming function for music instrument exercise associating a user device and a remote user device.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications that may be made without departing from the scope of the present invention as defined in the appended claims.

The invention claimed is:

1. A computer implemented method for providing real-time interaction between a first player and a second player to collaborate for a musical performance over a network, comprising:
   maintaining a reference data item associated to at least a portion of a musical performance, the reference data item generated using a musical instrument performed by at least one user;
   receiving first user input data generated using a first musical instrument performed by the first user, the received first user input data associated with the first musical instrument and the musical performance;
   receiving second user input data generated using a second musical instrument performed by the second user, the received second user input data associated with the second musical instrument and the musical performance;
   detecting a missing data packet within the received second user input data when generating real-time collaboration data for the musical performance;
   replacing the missing data packet using the reference data item to correct the second user input data; and
   generating real-time collaboration data for the musical performance based on the corrected second user input data.

2. The method of claim 1, further comprising generating real-time collaboration data for the musical performance based on the corrected second user input data and the first user input data, wherein the second user input data is received over the network from a second user device being remote to a first user device.

3. The method of claim 2, further comprising:
   receiving the reference data item from the second user device over the network, the reference data item being generated using the second musical instrument.

4. The method of claim 1, further comprising:
   receiving the reference data item from a system server over the network, the reference data item being generated using a third musical instrument performed by a third user.

5. The method of claim 2, further comprising:
   generating audible information by the first user device based on the second user input data for providing real-time interaction between the first player and the second player to collaborate for the musical performance over the network.

6. The method of claim 1, wherein the missing data packet within the received second user input data comprises a segment of audio data, and the method further comprising:
   replacing the segment of the audio data with a portion of the reference data item of corresponding part of an earlier-recorded performance to provide corrected second user input data.

7. The method of claim 6, further comprising:
   maintaining the reference data item associated to at least a portion of a musical performance, the reference data item generated using a musical instrument performed by at least one user, wherein the reference data item comprising a plurality of corresponding audio data segments each corresponding to an earlier-recorded performance to provide available options for corrected second user input data.

8. The method of claim 7, further comprising:
   comparing harmonic content of the received second user input data with harmonic content of the plurality of corresponding audio data segments; and
   selecting at least one audio segment of the plurality of corresponding audio data segments based on the comparing step.

9. The method of claim 8, further comprising:
   selecting at least one audio segment of the plurality of corresponding audio data segments based on the comparing step to identify the at least one audio segment that matches best with immediate history of real-time audio of the second user input data that was still correctly received before the detected missed packet.

10. The method of claim 9, further comprising:
    generating a composite audio data segment using the selected at least one audio segment and immediate history of real-time audio of the second user input data that was still correctly received before the detected missed packet; and replacing the missing data packet using the composite audio data segment to correct the second user input data.

11. The method of claim 7, further comprising:
comparing timestamps of the plurality of corresponding audio data segments; and
selecting at least one audio segment of the plurality of corresponding audio data segments having most recent timestamp.

12. The method of claim 1, further comprising:
receiving the missing data packet after the second user input data is corrected using the reference data item; and
discarding the received missing data packet.

13. The method of claim 1, further comprising:
receiving the missing data packet after the second user input data is corrected using the reference data item;
comparing harmonic content of the missing data packet with harmonic content of the reference data item used to correct the second user input data;
determining based on the comparing step that the missing data packet comprises speech data; and
mixing the speech data to the generated real-time collaboration data.

14. The method of claim 2, wherein the first user device comprises a first clock and the second user device comprises a second clock, and the method further comprises:
receiving a synchronization message configured to synchronize the first clock with the second clock;
receiving click track information associated with the musical performance;
generating timing reference using the click-track information and the first clock;
generating audible information by the first user device based on the second user input data for providing real-time interaction between the first player and the second player to collaborate for the musical performance over the network; and
providing the timing reference together with the audible information.

15. The method of claim 14, wherein the timing reference comprises at least one of the following: audio information, visual information and tactile information.

16. The method of claim 14, further comprising:
generating collaboration data for the musical performance based on the first user input data and the corrected second user input data, wherein the first user input data and the corrected second user input data are synchronized when generating collaboration data using the click-track information.

17. The method of claim 1, wherein the musical instrument comprising at least one of the following:
a tangible musical instrument played by a user; and
a voice of a user.

18. An apparatus for providing real-time interaction between a first player and a second player to collaborate for a musical performance over a network, comprising:
a communication interface;
a user interface;
at least one processor; and
at least one memory including computer program code;
the at least one memory and the computer program code configured to, with the at least one processor, cause the apparatus to:
maintain a reference data item associated to at least a portion of a musical performance, the reference data item generated using a musical instrument performed by at least one user;
receive first user input data generated using a first musical instrument performed by the first user, the received first user input data associated with the first musical instrument and the musical performance;
receive second user input data generated using a second musical instrument performed by the second user, the received second user input data associated with the second musical instrument and the musical performance;
detect a missing data packet within the received second user input data when generating real-time collaboration data for the musical performance;
replace the missing data packet using the reference data item to correct the second user input data; and
generate real-time collaboration data for the musical performance based on the corrected second user input data.

19. The apparatus of claim 18, further comprising a clock device and the at least one memory and the computer program code configured to, with the at least one processor, cause the apparatus to:
receive a synchronization message configured to synchronize the clock device with a second clock of remote apparatus;
receive click track information associated with the musical performance;
generate timing reference using the click-track information and the clock device;
generate audible information based on the second user input data for providing real-time interaction between the first player and the second player to collaborate for the musical performance over the network; and
provide the timing reference together with the audible information.

20. A computer program embodied on a computer readable non-transitory medium comprising computer executable program code, which when executed by at least one processor of an apparatus, causes the apparatus to:
maintain a reference data item associated to at least a portion of a musical performance, the reference data item generated using a musical instrument performed by at least one user;
receive first user input data generated using a first musical instrument performed by the first user, the received first user input data associated with the first musical instrument and the musical performance;
receive second user input data generated using a second musical instrument performed by the second user, the received second user input data associated with the second musical instrument and the musical performance;
detect a missing data packet within the received second user input data when generating real-time collaboration data for the musical performance;
replace the missing data packet using the reference data item to correct the second user input data; and
generate real-time collaboration data for the musical performance based on the corrected second user input data.

* * * * *